United States Patent Office 3,494,775
Patented Feb. 10, 1970

3,494,775
PROTEIN ADHESIVE COMPOSITIONS CONTAINING AN AMINE-EPICHLOROHYDRIN CONDENSATE LATENT INSOLUBILIZING AGENT
Anthony Thomas Coscia, South Norwalk, Conn., and Joseph Hansbro Ross, South Bend, Ind., assignors to American Cyanamid Company, Stamford, Conn., a corporation of Maine
No Drawing. Continuation-in-part of application Ser. No. 270,533, Apr. 4, 1963. This application June 10, 1966, Ser. No. 556,574
Int. Cl. D21h *3/14;* C08h *7/00*
U.S. Cl. 106—124
7 Claims

ABSTRACT OF THE DISCLOSURE

Water-soluble amines having a molecular weight of less than 5,000 and containing at least two amine-reactive epichlorohydrin residues per molecule are latent insolubilizing agents for film-forming proteins in fluid aqueous paper- and film-coating compositions.

---

This is a continuation-in-part of copending application Ser. No. 270,533 filed on Apr. 4, 1963, and now abandoned.

The present invention relates to aqueous coating compositions containing a water-soluble film-forming protein as coating agent and a latent insolubilizing agent for the protein, and to paper and film of good wet-rub resistance coated on at least one side with the composition in dry cured state. The invention includes such coating compositions in fluid and in cured states, with and without a content of pigment.

The discovery has now been made that fluid aqueous paper- and film-coating compositions which comprise a water-soluble film-forming protein are improved by the presence therein of an amine-epichlorohydrin condensation product having amine-reactive epichlorohydrin residues, as is more particularly specified herein.

The compositions of the present invention possess the following important properties:

(1) The compositions (without and with pigment) yield water-resistant films when applied to a substrate and heated briefly at moderate temperature.

(2) The compositions are stable at and may be employed at an alkaline pH. As a result, they can be prepared in advance of need, and do not present a serious corrosion problem to metals or an acid tendering problem to substrates.

(3) When pigmented with clay, the compositions generally possess a significantly lower viscosity than that possessed by compositions wherein the insolubilizing agent is a substance other than an amine-epichlorohydrin condensate of the type described herein. The compositions may thus the coated onto paper at higher web speeds than would otherwise be the case.

The fluid compositions of the present invention in general are composed of a water-soluble film-forming protein dissolved in a suitable amount of water to afford a composition having a suitable viscosity for the intended use of the composition, and the latent insolubilizing agent.

Unpigmented (clear, transparent) coating compositions of the present invention are conveniently prepared by dissolving any of the common film-forming proteins in water which if desired or as necessary may contain a base (e.g., sodium hydroxide) as solution aid. The latent insolubilizing agent is then added in suitable amount.

Pigmented compositions of the present invention can be prepared by mixing an aqueous slurry of the desired pigment or mixture of pigments into the above-described clear, transparent composition.

If preferred, the clay slurry and the protein solution can be mixed first, and addition of the amine postponed until just before the composition is employed for its intended purpose.

Suitable pigments include papermaker's clay, titanium dioxide, calcium carbonate, phthalocyanine blue, ultramarine blue, and carbon black.

The term "amine-reactive epichlorohydrin residues" as used herein distinguishes epichlorohydrin residues which react rapidly with amines from epichlorohydrin residues which have already undergone reaction with amino groups. The latter have the formula —CH$_2$CHOHCH$_2$— and extend between two molecules, or connect two different nitrogen atoms of the same molecule, and are not available for insolubilization purposes.

The compositions are applied to any desired surface at any convenient thickness and are then dried thereon, preferably at elevated temperature. When applied to a thin substrate, for example paper, regenerated cellulose film or aluminum foil, the compositions dry and cure rapidly when these substrates are passed over steam-heated rolls having surface temperatures of 190°–250° F. Higher temperatures may be employed, up to at least 300° F. when the thermal resistance of the substrate permits.

In the case of thick substrates, for example fibrous ceiling tile, it is often more advantageous to dry the compositions at low temperature (70°–100°F.) and then to cure the protein-amine condensate to insoluble film state at the higher temperature.

Good results are obtained when the coating composition contains the protein and the latent insolubilizing agent in admixture. Coatings of better wet-rub resistance are achieved when the protein and the latent insolubilizing agent are partially pre-reacted by heating the two together for example at 50°–60° C. for a time sufficient to cause the insolubilizing agent to react partially with the protein but for a time insufficient to form a product which is water-insoluble.

The precise amount of the reactive amine-epichlorohydrin condensate which need be present in the coating composition in any instance depends chiefly upon the amount of wet-rub resistance which it is desired that the composition should possess when formed into a film on a suitable substrate (paper, paperboard, plaster, etc.), and this in turn generally depends upon the expected use of the substrate. The appropriate amount is consequently most easily determined by laboratory trial, as illustrated by the examples. The amount is small, typically less than 2% of the weight of the water, and consequently the reactive amine need not have a water-solubility in excess of 1%. It is this sense that the term "water-soluble" is used in the present specification with regard to the amine reaction product. Broadly, the invention does not depend upon the precise amount of the amine-epichlorohydrin product which is present in any instance, and small amounts produce beneficial effects. As a rule of thumb, we have found that about 10% of the protein-reactive amine-epichlorohydrin reaction products, based on the weight of the protein, is generally sufficient to cause the coating to have generally acceptable wet-rub resistance, and it is an important advantage that even in compositions containing this large amount of amine reaction product the pigment remains present in deflocculated condition, and is not in "shocked" or flocculated state. Smaller amounts of the amine reaction product are enough in other instances.

Suitable latent insolubilizing agents are in general water-soluble amines which have an average content of at least two amine-reactive epichlorohydrin residues per molecule and which are of low molecular weight, i.e., of a molecular weight less than 5,000. When condensation products having higher molecular weights are employed, the resulting solutions have poor storage-stability and their viscosity is undesirably high. In practice, the amine-epichlorohydrin condensates which are employed have molecular weights less than 2,000; the viscosity and stability characteristics of the resulting solutions are sufficiently good to permit long range transportation and extended storage of the solutions. Best results are obtained when the amine-epichlorohydrin condensation products employed are in monomeric state or in low polymeric state or in pentameric or lower state. Such amines provide solutions of the lowest viscosity and which have the long stability, and moreover provide coatings which, when cured, possess the best wet-rub resistance.

The presence of high molecular weight amine-epichlorohydrin condensation products, i.e., those having molecular weights higher than 5,000, is additionally undesirable when the solutions contain a hydrophilic pigment. These high molecular weight polyamines cause a severe increase in the viscosity of the coating color. Moreover, the higher molecular weight polyamines are less efficient on a weight for weight basis, and this becomes evident when the molecular weight of the amine-epichlorohydrin condensation products is above 2,000. Condensation products in monomeric state (i.e., condensation products which contain no epichlorohydrin linkages) are most efficient on a weight for weight basis and cause the least increase in viscosity and are consequently preferred.

Amine-epichlorohydrin condensates suitable for use in the present invention include amines which have the theoretical configurations $NR_3$, $ANR_2$,

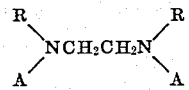

$R_2NCH_2CH_2NR_2$, $CH_3NR_2$, $R_2NCH_2CH_2-O-CH_2CH_2NR_2$ $[CH_3NR_3]^+Cl^-$, $R_2N(CH_2)_3-O-(CH_2)_3NR_2$.

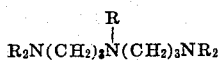

and $HOCH_2CH_2NR_2$, wherein the R's designate amine-reactive epihalohydrin residues, and the A's designate lower alkyl, lower hydroxyalkyl, carboethoxyalkyl, nitroalkyl, and other epoxy non-reactive substituents. In these reaction products the epichlorohydrin or other epihalohydrin residues may have a cyclic (e.g., epoxy or azetidinium) configuration.

In other words, these agents are the reaction product of a water-soluble mono- or polyamine which contains at least two reactive basic hydrogen atoms (or a mixture of two or more than two of such amines) with sufficient epichlorohydrin or other epihalohydrin to form a condensate having a molecular weight less than 5,000 and which contains per average molecule at least two epihalohydrin residues, and which have the capacity of rapidly reacting with amine groups at room or elevated temperature. Suitable starting amines are ammonia, methylamine, ethanolamine, β-alanine ethyl ester, ethylenediamine, 3,3'-iminobispropylamine, diethylenetriamine, 2,2' - oxydipropylamine, aniline, m-phenylenediamine, and 3-ethoxypropyl-1-amine. Suitable amines and methods for their preparation are disclosed by McKelvey et al. in J. Orig. Chem. 25, 1424 (1960).

The insolubilizing agents can be prepared by mixing one or more suitable amines of the class described with an epihalohydrin in the presence of a mutual solvent which acts as heat sink and reaction moderator, and employing sufficient cooling to cause the reaction to proceed at a slow rate. Water alone or water-alcohol mixtures are suitable solvents. In the laboratory we have found it advantageous to perform the reaction in the temperature range of 32°–42° C.

The reaction is stopped after the epihalohydrin has reacted with the amine to the extent of one of its functionalities (as shown by the disappearance of two phases) preferably when the product is monomeric or dimeric, and before the macromolecule which forms attains an average molecular weight of about 5,000.

The molecular weights of the aforesaid amine-epichlorohydrin condensation product are determined by the vapor pressure osmometry method.

The compositions of the present invention with or without pigment may be employed to provide coatings for paper, wallboard, plaster, etc. The coatings slowly develop some wet-rub resistance on drying at room temperature, but it is preferred that they be thermocured by heating in the range of 200°–300° F. for ½ to 5 minutes. The amine-reactive epichlorohydrin residues react with the protein and insolubilize it by a cross-linking reaction.

The invention will be more particularly illustrated by the examples which follow, which constitute preferred embodiments of the invention and are not to be construed as limitations thereon.

EXAMPLE 1

The following illustrates the preparation, according to the present invention, of a number of aqueous proteinaceous paper-coating compositions each containing a different amine-epichlorohydrin condensate as latent insolubilizing agent for the protein.

Amine A 179 g. of 29% aqeuos ammonia (3.0 moles), 300 ml. of isopropanol, and 833 g. of epichlorohydrin (9.0 moles) are mixed with stirring in a beaker provided with sufficient cooling to keep the temperature of the mixture at 30°–34° C. during the reaction. The product is a 70% by weight solution of an amine which has an average content of three amine-reactive epichlorohydrin residues per molecule and which has the theoretical formula:

$N(CH_2CHOHCH_2Cl)_3$

It is designated tri-(3 - chloro - 2 - hydroxypropyl)amine. The product is essentially monomeric and hence has a molecular weight of about 295.

Amine B

The procedure for the preparation of amine A is repeated, except that 185 g. (2.0 mols) of epichlorohydrin, 60 g. (1.0 mol) of 29% aqueous ammonia, and 85 ml. of isopropanol are used. The product is a solution which contains 56% by weight of an amine having an average content of two secondary amine-reactive epichlorohydrin residues per molecule, and has the theoretical formula $HN(CH_2CHOHCH_2Cl)_2$. It is designated di(3-chloro-2-hydroxypropyl)amine and has a molecular weight which is a low multiple of 202.

Amine C

To a mixture of 185 g. (2 mols) of epichlorohydrin and 57 ml. of deionized water is added 42 g. (0.4 mol) of diethylenetriamine in three equal portions at 15-minute intervals with stirring. Cooling is applied to keep the reaction mixture at 23°–38° C. during addition of the diethylenetriamine. The temperature is then maintained at 30° C. for 3 hours, at which time the reaction of the epichlorohydrin to the extent of one of its functionalities is substantially complete. The resulting amine contains five epichlorohydrin residues per molecule and has the theoretical formula

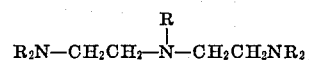

wherein the R's designate the amine-reactive residues of epichlorohydrin. It is designated penta(3-chloro-2-hydroxypropyl)diethylenetriamine. Its molecular weight is approximately 568.

Amine D

To 25 ml. of ethanolamine is added 60 ml. of epichlorohydrin with efficient stirring and cooling to maintain the temperature at 30°–32° C. to control the exotherm. Cooling is continued until the exothermic reaction subsides. The resulting yellow syrup is dissolved in water to a 40% solution.

Amine E

To 31 g. of methylamine in 47 g. of water is slowly added 185 g. of epichlorohydrin with rapid stirring and sufficient cooling to maintain the temperature of the reaction mixture below 50° C. When the exotherm subsides, the mixture is diluted to 70% solids by addition of water. The product has the theoretical structure

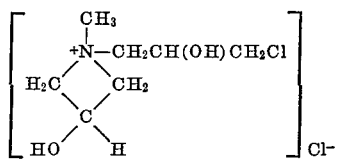

A similar product is obtained when the $CH_3$-substituent attached to the quaternary nitrogen atom is any other lower alkyl substituent or when it is hydroxyalkyl wherein the alkyl group is not larger than propyl.

The present invention includes the foregoing products and water-soluble oligomers thereof which have a molecular weight less than 5,000.

PREPARATION OF COATING COMPOSITIONS

Into 619 g. of water is stirred first 126 g. of casein (90% solids), and then 15 g. of 29% ammonium hydroxide. The mixture is heated at 55° C. with continued stirring until the casein is completely dissolved; about 20 minutes are required. The water lost by evaporation is replaced. The solution has a pH of 9.0–9.2 and contains about 15% of casein (dry basis) by weight.

333 g. of the 15% casein solution is added with stirring to a dispersion of 503 g. of paper-coating clay in 232 cc. of water containing 1 g. of sodium tetraphosphate and 1 g. of sodium carbonate. This is mixed for 1 hour and 82 cc. of water finally added. The slurry contains 48% total solids by weight, and the weight of the clay is 10 times the weight of the casein. Six 100-g. aliquots are removed from the resulting slurry. To five of these are respectively added with stirring sufficient quantities of the solutions of the amine-epichlorohydrin condensation products A–E (described above) to supply in each instance 10% of the condensation products based on the weight of the casein. One aliquot is reserved as control, and to this nothing is added. The pH of the control suspension is about 9.

The foregoing compositions are applied at a coating weight of 15 lb. per 25" x 36"/500 ream to coating raw stock sheets by use of a 0.0005" knife applicator. The sheets are dried at room temperature and oven-cured at 300° F. for one minute, and are then calendered. The sheets are tested for their wet-rub resistance by a standard laboratory method wherein the test sheet after being conditioned at room temperature is placed on a black sheet and rubbed with a rubber-covered thumb moistened with 0.02% aqueous sodium hydroxide solution so as to transfer any of the coating which may be removed by the thumb to the underlying black sheet. The results are reported on a scale of 10 in which 0 designates rapid and extensive removal of the coating, 10 designates no removal of the coating, and intermediate values designate proportional amounts removed.

Results are as follows:

| Insolubilizing Agent | | | | Wet Rub Test [3] |
|---|---|---|---|---|
| | Parent Amine | Mols Epi.[1] | Percent in Coat.[2] | |
| Number: | | | | |
| | None (control) | | | 2 |
| A | Ammonia | 3 | 10 | 10 |
| B | do | 2 | 10 | 10 |
| C | Diethylenetriamine | 5 | 10 | 9 |
| D | Ethanolamine | 2 | 10 | 7 |
| E | Methylamine | 2 | 10 | 9 |

[1] Mols epichlorohydrin per mol of amine.
[2] Percent amine-epichlorohydrin reaction product in coating based on weight of the casein.
[3] See text above.

The compositions containing agents A–E are stable for at least a month at 70° F.

EXAMPLE 2

The following illustrates a coating composition wherein the amine-epichlorohydrin condensation product is partially pre-reacted or "cooked" with the casein.

A composition is prepared according to Example 1(E), except that the condensation product of 1 mol of methylamine with 2 mols of epichlorohydrin is used as the latent insolubilizing agent, and the insolubilizing agent is cooked for 5 minutes with the casein at 55° C. and then added to clay dispersion.

This composition becomes water-insoluble when coated on paper and the paper is heated for 1 minute in an oven at 220° F. The resulting paper has a wet-rub test value of 6. After one minute of additional heating in an oven at 300° F., the coating has a wet-rub resistance of 9–10.

Had the condensation product not been previously cooked with the casein, the paper after drying for 1 minute at 220° F. would have had a wet-rub value of only 2–3.

EXAMPLE 3

The following illustrates the utility of the composition of the present invention as topcoat on various surfaces.

A coating composition is prepared by taking an aliquot from the aqueous casein solution (pH 9.2) of Example 1, adding thereto 10% (based on the weight of the casein therein) of the methylamine-epichlorohydrin condensate of Example 2, and diluting to 10% solids by addition of water. The resulting clear viscous solution is applied to polyalkylene films and to glass and, in pigmented state (containing 6.6 parts of $TiO_2$ per part of casein), to building boards as shown in the table below, by means of Bird applicators of the size shown. The coated specimens are laid horizontally and are dried in a laboratory oven at the temperatures and for the times shown. The resistance of the coat to water is measured by applying drops of water to the coating, allowing the drops to remain on the surface for 30 seconds, and then firmly rubbing the thumb across the surface four times. A rating of "good" means that virtually none of the coating is removed, and that the coating is not marred by the thumb. A rating of "poor" means that the coating possesses substantially no water-resistance.

| Substrate | Bird Applic. Size, in. | Dried Temp./ °C. | Mins. | Wet Rub Test |
|---|---|---|---|---|
| Run: | | | | |
| 1 Polyethylene, pigmented | 0.0005 | 95 | 10 | Good. |
| 2 Polypropylene, oxidized | 0.0005 | 95 | 10 | Do. |
| 3 Glass | 0.0015 | 150 | 2 | Do. |
| 4 Wood particle board | 0.0015 | 150 | 5 | Do. |
| 5 Plaster board | 0.0015 | 150 | 5 | Do. |
| 6 Wood fiber ceiling tile board | 0.0015 | 150 | 5 | Do. |
| 7 Mineral fiber ceiling tile board | 0.0015 | 150 | 5 | Do. |

Results are "poor" when the amine-epichlorohydrin condensate is omitted.

EXAMPLE 4

A 10% by weight solution of gelatin in water is divided into two parts. One is left untreated, as control. To the other is added 20% (based on the weight of the gelatin) of the methylamine-epichlorohydrin condensate of Example 2. A film of each of the resulting solutions is drawn down on a glass plate by use of a 0.0015" orifice Bird applicator.

The coatings are allowed to dry at 20° C., at which point the coatings possess "poor" water-resistance.

The plates are then placed for 5 minutes in an oven at 150° C. Both coatings on the plates are then clear. The water-resistance of the control film is "poor" but the water-resistance of the test film is "good" as determined by the method of Example 3.

EXAMPLE 5

The following illustrates the comparative storage stability of a protein composition according to the present invention containing a low molecular weight amine-epichlorohydrin condensate as latent insolubilizing agent.

Two coating compositions are prepared by the method of Example 1, the only difference being that in one instance the latent insolubilizing agent is the methylamine-epichlorohydrin condensation product E of Example 1, and in the other instance the latent insolubilizing agent is tri(methoxymethyl)melamine.

The viscosities of the two compositions are determined initially, and again after storage for 24 hours at 20° C. Results are as follows.

| Latent insolubilizing agent | Viscosity, cp. | | |
|---|---|---|---|
| | Initial | After 24 hr. | Percent incr. |
| Methylamine-epi cond. prod. | 1,356 | 1,491 | 10 |
| Tri(methoxymethyl) melamine | 2,240 | 4,480 | 100 |

EXAMPLE 6

The following illustrates the preparation and properties of a pigmented composition according to the present invention, wherein the protein is soya (alpha) protein and the pigment is clay.

The compositions are prepared by first partially reacting the soya protein with an amine-epichlorohydrin condensation product by heating an aqueous solution of the two at 130° F. for 15 minutes, and mixing the product with a fluid aqueous dispersion of a paper-coating clay, prepared as described in Example 2, the proportions of materials being employed in such proportions that the weight of the insolubilizing agent is 10% on the weight of the protein, the weight of the protein is 10% of the weight of the clay, and the final composition contains 48% solids by weight. The final composition is stirred for 1 hour to ensure complete wetting of the clay particles with the aqueous phase.

The composition is applied to coating raw stock at the weights shown below and samples of the paper are oven dried for 1 minute at 300° F.

The amine-epichlorohydrin condensation products are those designated by like letters in Example 1.

The coatings are tested by the method of Example 1. Results are as follows.

| | Composition | |
|---|---|---|
| | 1 | 2 |
| Amine-epichlorohydrin condensate used [1] | A | E |
| pH of composition (after addition of pigment) | 8.5 | 8.8 |
| Viscosity, cp. (Brookfield 100 r.p.m.) | 1,760 | 1,920 |
| Coating, wt. lb./ream | 13.0 | 14.0 |
| Wet rub test, Dried: 300° F., 1 minute | 10 | 9 |

[1] See Example 1.

The results shown that excellent wet rub-resistance is obtained when the composition is dried for a time and at a temperature in common use in the paper coating art.

We claim:
1. A fluid aqueous paper- and film-coating composition comprising a water-soluble film-forming protein and a small but effective amount of a water-soluble amine having a molecular weight less than 5,000 and having an average content of at least two amine-reactive epichlorohydrin residues per molecule as latent insolubilizing agent for said protein, said amine being the reaction product of at least one water-soluble amine which contains at least two reactive basic hydrogen atoms with sufficient epichlorohydrin to form a condensate having a molecular weight less than 5,000 and which contains per average molecule at least two epichlorohydrin residues.

2. A composition according to claim 1 wherein the amine is a 1:2 to 1:3 molar ratio ammonia-epichlorohydrin condensation product.

3. A composition according to claim 1 wherein the amine is a 1:2 molar ratio methylamine:epichlorohydrin condensation product.

4. A composition according to claim 1 wherein the amine has an average content of less than 10 epichlorohydrin residues per molecule.

5. A composition according to claim 1 having a uniformly dispersed content of a paper-coating clay.

6. A composition according to claim 1 wherein the amine is partially reacted with the protein by heating the two together for a time sufficient to cause the amine to react partially with the protein but for a time insufficient to form a product which is water-insoluble.

7. Paper coated on at least one side with a composition according to claim 1 in dry cured state.

References Cited

UNITED STATES PATENTS

| | | | |
|---|---|---|---|
| 2,595,935 | 5/1952 | Daniel et al. | 162—164 |
| 2,601,597 | 6/1952 | Daniel et al. | 162—164 |
| 2,753,372 | 7/1956 | Lundberg | 162—164 |
| 2,882,250 | 4/1959 | Baker | 260—6 |
| 3,166,523 | 1/1965 | Weinheimer | 260—6 |
| 3,207,613 | 9/1965 | Merrill | 260—6 |
| 3,224,986 | 12/1965 | Butler et al. | 260—6 |
| 3,239,491 | 3/1966 | Tsou et al. | 162—164 |
| 3,332,901 | 7/1967 | Keim | 117—155 |
| 3,332,797 | 7/1967 | Strasser et al. | 117—161 |

FOREIGN PATENTS

| | | |
|---|---|---|
| 1,075,358 | 7/1967 | Great Britain. |
| 94,514 | 12/1959 | Denmark. |
| 944,847 | 6/1957 | Germany. |
| 39/23,566 | 10/1964 | Japan. |
| 41/4,981 | 3/1966 | Japan. |

OTHER REFERENCES

Chem. Abst. 53: 12694f, "Pigment Prints," Lehmann et al.

Chem. Abst. 41: 6458i, "Interaction of Alkylene and Amines," Smith et al.

Kirk's Encycl. of Techn., vol. 2, page 140 (1964).

Journal of Organic Chem., vol. 25, pp. 1424–28, McKelvey et al.

Heterocyclic Compounds, Parts I and II, pp. 327 and 888–897, Weissberger (1964).

WILLIAM H. SHORT, Primary Examiner

E. WOODBERRY, Assistant Examiner

U.S. Cl. X.R.

106—125, 138, 154; 117—156; 260—6